(12) United States Patent
Chen

(10) Patent No.: US 11,921,940 B1
(45) Date of Patent: Mar. 5, 2024

(54) OPTICAL NAVIGATION DEVICE CAPABLE OF AUTOMATICALLY SWITCHING BETWEEN DIFFERENT TRACKING MODES IN RESPONSE TO DIFFERENT TRACKING SURFACES

(71) Applicant: PixArt Imaging Inc., Hsin-Chu (TW)

(72) Inventor: Tzu-Yu Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/121,011

(22) Filed: Mar. 14, 2023

(51) Int. Cl.
  *G06F 3/038* (2013.01)
  *G06F 3/03* (2006.01)
  *G06F 3/0354* (2013.01)

(52) U.S. Cl.
  CPC .......... *G06F 3/0383* (2013.01); *G06F 3/0304* (2013.01); *G06F 3/03543* (2013.01)

(58) Field of Classification Search
  CPC ... G06F 3/0383; G06F 3/0304; G06F 3/03543
  See application file for complete search history.

(56) References Cited

U.S. PATENT DOCUMENTS

2020/0137285 A1* 4/2020 Lee ................. H04N 23/73
2022/0100288 A1* 3/2022 Chauvin ............. G06F 3/03543

* cited by examiner

*Primary Examiner* — Jonathan A Boyd
(74) *Attorney, Agent, or Firm* — Winston Hsu

(57) ABSTRACT

A method of an optical navigation device having a plurality of different tracking modes includes: using an image sensor to sense and generate a plurality of image frames; and, controlling and changing a tracking mode of the optical navigation device from a first tracking mode into a second tracking mode in response to an event that the optical navigation device changes from a first surface operation condition into a second surface operation condition.

18 Claims, 7 Drawing Sheets

|  | Glass | Non-glass |
|---|---|---|
| Maximum frame rate | Low | High |
| Minimum frame rate | High | Low |
| Sensor sensitivity | Low | High |
| Image size | Large | Small |
| Power consumption | High | Low |

FIG. 3

OPTICAL NAVIGATION DEVICE CAPABLE OF AUTOMATICALLY SWITCHING BETWEEN DIFFERENT TRACKING MODES IN RESPONSE TO DIFFERENT TRACKING SURFACES

BACKGROUND OF THE INVENTION

1. Field of the Invention

The invention relates to an optical navigation mechanism, and more particularly to an optical navigation device and a corresponding method.

2. Description of the Prior Art

Generally speaking, the tracking performance of a conventional optical navigation device is usually limited by a glass working surface since the glass working surface may include fewer texture features and its texture feature characteristic is totally different from that of a non-glass surface. In addition, the conventional optical navigation device is not suitable for and cannot be applied into a variety of different working surfaces.

SUMMARY OF THE INVENTION

Therefore of one of the objectives of the invention is to provide an optical navigation device and a corresponding method, to solve the above-mentioned problems.

According to embodiments of the invention, an optical navigation device having a plurality of different tracking modes is disclosed. The optical navigation device comprises an image sensor and a processing circuit. The image sensor is arranged for sensing and generating a plurality of image frames. The processing circuit is coupled to the image sensor, and is arranged for controlling and changing a tracking mode of the optical navigation device from a first tracking mode into a second tracking mode in response to an event that the optical navigation device changes from a first surface operation condition into a second surface operation condition. The first surface operation condition and the second surface operation condition are respectively associated with different tracking surfaces on which the optical navigation device placed. At least one of the different tracking surfaces is characterized by a high reflectivity or a low surface roughness. A power consumption of the optical navigation device is different after the tracking mode switches from the first tracking mode into the second tracking mode.

According to the embodiments, a method of an optical navigation device having a plurality of different tracking modes is disclosed. The method comprises: using an image sensor to sense and generate a plurality of image frames; controlling and changing a tracking mode of the optical navigation device from a first tracking mode into a second tracking mode in response to an event that the optical navigation device changes from a first surface operation condition into a second surface operation condition. The first surface operation condition and the second surface operation condition are respectively associated with different tracking surfaces on which the optical navigation device placed. At least one of the different tracking surfaces is characterized by a high reflectivity or a low surface roughness. A power consumption of the optical navigation device is different after the tracking mode switches from the first tracking mode into the second tracking mode.

According to the embodiments, the provided method can balance the requirements of a better tracking performance and less power consumption.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of the operations of the optical navigation device as shown in FIG. 1 using different tracking modes in response to different surface operation conditions such as a glass surface operation condition and a non-glass surface operation condition according to the embodiments of the invention.

DETAILED DESCRIPTION

The invention aims at providing a technical solution of an optical navigation system/scheme capable of effectively detecting the different working surface conditions and automatically switching between different tracking modes in response to the detected different working surface conditions. More particularly, the provided optical navigation system/scheme is more suitable to be applied onto and used on different working surfaces such as different glass surfaces (but not limited), compared to a conventional optical navigation scheme.

Figure 1:
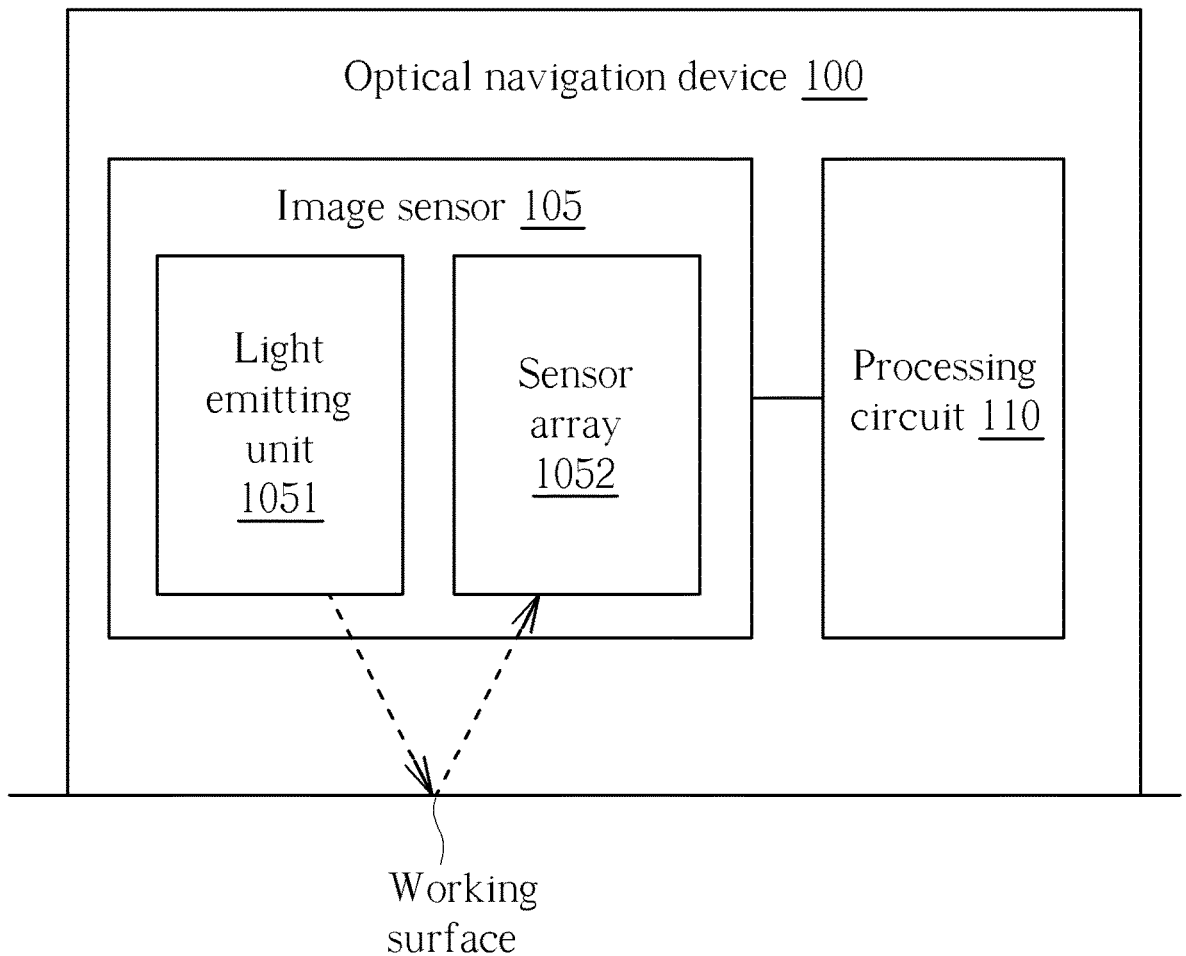
FIG. 1 is a diagram of an example of an optical navigation device according to an embodiment of the invention.

FIG. 1 is a diagram of an example of an optical navigation device/system 100 according to an embodiment of the invention. The optical navigation device 100 for example (but not limited) is an optical mouse device which may be placed onto one or more different working surfaces and used/operated by a user. The optical navigation device 100 comprises/supports a plurality of different tracking modes respectively to different working surfaces (or different working surface conditions), and it can automatically switch between different tracking modes in response to the detected different working surface conditions.

In practice, the optical navigation device 100 comprises an image sensor 105 and a processing circuit 110 such as a digital signal processor (DSP). The image sensor 105 comprises a light emitting unit 1051 such as LED (light emission diode) and a sensor array 1052 (i.e. an image sensor array having multiple pixel units such as sensor pixels or sub-pixels, not shown in FIG. 1). The image sensor 105 is arranged for sensing and generating a plurality of image frames, and the pixel values of each image frame are generated from the pixel units of the sensor array 1052. In practice, the light emitting unit 1051 is arranged for generating a light ray onto the working surface, and the sensor array 1052 is arranged for sensing and capturing the reflected light ray from the working surface to generate the plurality of captured image frames into the processing circuit 110. The processing circuit 110 is coupled to the image sensor 105 and is arranged for performing a navigation operation based on the captured image frames, e.g. detecting the motion/behavior of the optical navigation device 100 when being controlled by the user on the working surface.

The processing circuit 110 is coupled to the image sensor 105 and is arranged for controlling and changing a tracking mode of the optical navigation device 100 from a first tracking mode into a second tracking mode in response to an event that the optical navigation device 100 changes from a first surface operation condition into a second surface operation condition. The first surface operation condition and the second surface operation condition are respectively associated with different tracking surfaces on which the optical navigation device 100 placed. At least one of the different tracking surfaces is characterized by a high reflectivity or a low surface roughness. A power consumption of the optical navigation device 100 is different after the tracking mode switches from the first tracking mode into the second tracking mode. In one embodiment, the first surface operation condition is a glass surface operation condition corresponding to a glass surface while the second surface operation condition is a non-glass surface operation condition corresponding to a non-glass surface.

In practice, the provided optical navigation device 100 is capable of detecting and determining whether a current working surface (i.e. the working surface which the provided optical navigation device 100 is currently placed on or is to be placed onto) is a glass surface or a non-glass surface according the image characteristics detected from the current working surface, without adding other circuit components/costs. In addition, the provided optical navigation device 100 is capable of providing different better/optimal optical settings in response to the different working surfaces according to different detection results respectively associated with the different working surfaces. For example, when detecting the current working surface is a glass surface, the optical navigation device 100 switches into and provides a first better/optimal optical setting of a first tracking mode for the tracking. When detecting the current working surface is a non-glass surface, the optical navigation device 100 switches into and provides a second better/optimal optical setting of a second tracking mode for the tracking. By doing so, the optical navigation device 100 can provide a better tracking performance for the user when the provided optical navigation device 100 is placed on a glass surface and operates based on the first better/optimal optical setting, and it can save more power and/or operate at a higher/maximum rate when the optical navigation device 100 is placed on a non-glass surface and operates based on the second better/optimal optical setting.

Figure 2:
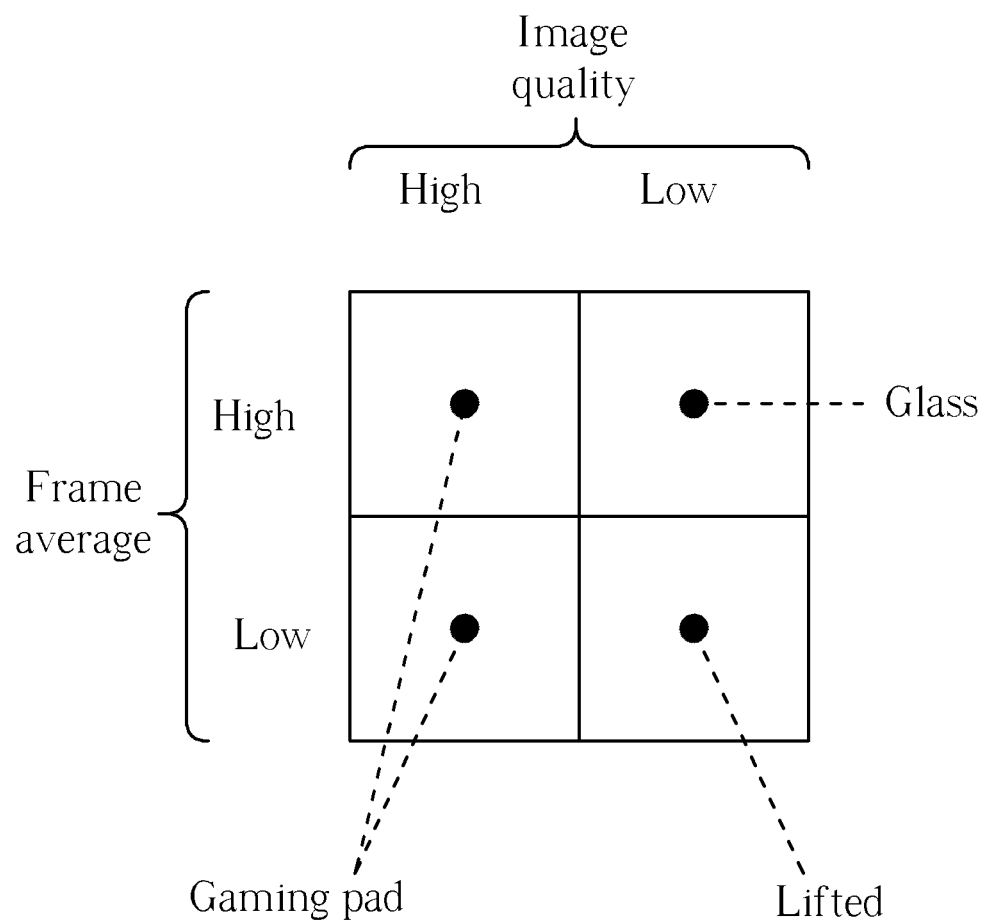
FIG. 2 is a diagram showing an example of the detection of the optical navigation device (or processing circuit) according to the embodiment of the invention.

FIG. 2 is a diagram showing an example of the detection of the optical navigation device 100 (or processing circuit 110) according to the embodiment of the invention. The optical navigation device 100 for example (but not limited) may be a gamming pad device (or a gamming mouse device) with a high image resolution or a high image sensitivity. The optical navigation device 100 (or processing circuit 110) can be arranged to determine the user's controlling behavior applied for the optical navigation device 100 according to the frame average brightness of the captured image frames and the image quality of the image pattern with features detected from the captured image frames. For example, the optical navigation device 100 (or processing circuit 110) may roughly and effectively determine and distinguish three controlling behavior scenarios. For instance, the optical navigation device 100 (or processing circuit 110) is arranged to calculate or detect the frame average brightness of the captured image frames and the image quality of the image pattern with features detected from the captured image frames. When detecting that the image quality of the detected image pattern with features is high (e.g. higher than a first threshold) and detecting that the frame average brightness is high (e.g. higher than a second threshold), the optical navigation device 100 (or processing circuit 110) determines that the optical navigation device 100, operated by the user, now may be placed on a general/common surface and may be operated in a normal manner, and in this situation the optical navigation device 100 operates and provides the tracking functions of the gamming mouse device.

When detecting that the image quality of the detected image pattern with features is high (e.g. higher than the first threshold) and detecting that the frame average brightness becomes low (e.g. lower than the second threshold), the optical navigation device 100 (or processing circuit 110) may merely determine that the frame average brightness is changed and still determines that the optical navigation device 100, operated by the user, now may be placed on or moved onto another portion of the general/common surface and may be operated in a normal manner, and in this situation the optical navigation device 100 also operates and provides the tracking functions of the gamming mouse device. That is, in the above two situations, the optical navigation device 100 (or processing circuit 110) may determine that the optical navigation device 100 is used and placed on a non-glass surface.

When detecting that the image quality of the detected image pattern with features becomes low (e.g. lower than the first threshold) and detecting that the frame average brightness is high (e.g. higher than the second threshold), the optical navigation device 100 (or processing circuit 110) may determine that the optical navigation device 100, operated by the user, now may be moved from the non-glass surface onto a glass surface and may be operated in a normal manner, and in this situation the optical navigation device 100 also operates and provides the tracking functions of the gamming mouse device based on the a different optical setting corresponding to the glass surface operation condition.

When detecting that the image quality of the detected image pattern with features becomes low (e.g. lower than the first threshold) and also detecting that the frame average brightness becomes low (e.g. lower than the second threshold), the optical navigation device 100 (or processing circuit 110) may determine that the optical navigation device 100, operated by the user, now may be temporarily lifted up from the working surface, and in this situation the optical navigation device 100 does not provide the tracking functions of the gamming mouse device. For example, the optical navigation device 100 can lock the cursor position of the optical navigation device 100.

FIG. 3 is a diagram of the operations of the optical navigation device 100 as shown in FIG. 1 using different tracking modes in response to different surface operation conditions such as a glass surface operation condition and a non-glass surface operation condition according to the embodiments of the invention. In FIG. 3, when determining that the working surface is changed from a non-glass surface to a glass surface, the processing circuit 110 determines that the optical navigation device 100 should be operative in a first tracking mode in which the maximum frame rate of optical navigation device 100 may be configured be lower, the minimum frame rate of optical navigation device 100 may be configured be higher, the sensor sensitivity of the sensor array 1052 may be configured to be lower, the image size of the generated image frame may be configured to be larger, and/or a power consumption of optical navigation device 100 may be needed to be higher. Alternatively, when determining that the working surface changed from a glass surface to a non-glass surface, the processing circuit 110 determines that the optical navigation device 100 should be operative in a second tracking mode in which the maximum frame rate of optical navigation device 100 can be configured be higher, the minimum frame rate of optical navigation device 100 can be configured be lower, the needed sensor sensitivity of the sensor array 1052 can be configured to be higher, the needed image size of the generated image frame can be configured to be smaller, and/or the needed power consumption of optical navigation device 100 becomes lower.

In other words, the processing circuit 110 equivalently can dynamically adjust the optical navigation device's 100 maximum frame rate, minimum frame rate, sensor sensitivity, frame image size, and/or the needed power consumption in response to different surface operation conditions. For example, when switching into the second tracking mode corresponding to the non-glass surface operation condition, the processing circuit 110 increases the maximum value of a frame rate of the image sensor 105 in the first tracking mode corresponding to the glass surface operation condition, to perform an optical navigation operation based on the increased maximum value of the frame rate. When switching into the first tracking mode from the second tracking mode, the processing circuit 110 decreases the maximum value of the frame rate of the image sensor 105. Thus, when the optical navigation device 100 supports different maximum values of the frame rate for the different tracking performance requirements, the processing circuit 110 can select a higher value as the maximum frame rate so as to provide a better tracking performance of the gamming mouse device in response to the non-glass surface, and it can select a lower value as the maximum frame rate so as to provide a general tracking performance of a general mouse device in response to the glass surface.

Further, in one embodiment, when switching into the second tracking mode corresponding to the non-glass surface operation condition, the processing circuit 110 decreases the minimum value of the frame rate of the image sensor 105 previously used in the first tracking mode corresponding to the glass surface operation condition, to perform an optical navigation operation based on the decreased minimum value of the frame rate. When switching into the first tracking mode from the second tracking mode, the processing circuit 110 increases the minimum value of the frame rate of the image sensor 105, to perform the optical navigation operation based on the increased minimum frame rate. Thus, when the optical navigation device 100 supports different minimum values of the frame rate for the different tracking performance requirements, the processing circuit 110 can select a lower minimum frame rate since the lower minimum frame rate can still achieve the minimum tracking requirement when the working surface is the non-glass surface, and it can select a higher minimum frame rate as far as possible to achieve the minimum tracking requirement when the working surface is the glass surface.

Further, in one embodiment, when switching into the second tracking mode corresponding to the non-glass surface operation condition, the processing circuit 110 is arranged to controlling the image sensor 105 increasing a sensor sensitivity of the image sensor 105 previously used in the first tracking mode corresponding to the glass surface operation condition, to perform an optical navigation operation based on the increased sensor sensitivity of the image sensor 105. When switching into the first tracking mode from the second tracking mode, the processing circuit 110 decreases the sensor sensitivity of the image sensor 105, to perform the optical navigation operation based on the decreased sensor sensitivity of the image sensor 105. Thus, when the optical navigation device 100 supports different sensor sensitivity settings for the different tracking performance requirements, the processing circuit 110 can select a higher sensor sensitivity setting when the working surface is the non-glass surface so as to generate the image pattern with more clear features, and it can select a lower sensor sensitivity setting when the working surface is the glass surface so as to avoid generating undesired features.

Further, in one embodiment, when switching into the second tracking mode corresponding to the non-glass surface operation condition, the processing circuit 110 is arranged to controlling the image sensor 105 decreasing an image frame size which can be sensed by the image sensor 105 previously used in the first tracking mode corresponding to the glass surface operation condition, to perform an optical navigation operation based on the decreased image frame size. When switching into the first tracking mode from the second tracking mode, the processing circuit 110 increases the image frame size which can be sensed by the image sensor 105 to perform the optical navigation operation based on the increased image frame size. Thus, when the optical navigation device 100 supports different image frame sizes for the different tracking performance requirements, the processing circuit 110 can select a smaller image frame size when the working surface is the non-glass surface since the image quality is enough for achieving a tracking performance requirement, and it selects a larger image frame size when the working surface is the glass surface so as to make the image quality be enough for achieving the tracking performance requirement.

In the embodiments, when switching into the second tracking mode corresponding to the non-glass surface operation condition, the processing circuit 110 is arranged to controlling and decreasing a power consumption setting of the optical navigation device 100 previously used in the first tracking mode corresponding to the glass surface operation condition, to perform an optical navigation operation based on the decreased power consumption setting. When switching into the first tracking mode from the second tracking mode, the processing circuit 110 can increase the power consumption setting of the optical navigation device 100 to perform the optical navigation operation based on the increased power consumption setting. That is, the processing circuit 110 (or optical navigation device 100) can select an appropriate or optimal power consumption setting from different power consumption settings to perform the optical navigation operation in response to the type of the current working surface.

Further, in one embodiment, when switching into the second tracking mode corresponding to the non-glass surface operation condition, the processing circuit 110 is arranged to controlling and decreasing an exposure time length of the optical navigation device 100 previously used in the first tracking mode corresponding to the glass surface operation condition, to perform an optical navigation operation based on the decreased exposure time length. When switching into the first tracking mode from the second tracking mode, the processing circuit 110 increases the exposure time length of the optical navigation device 100 to perform the optical navigation operation based on the increased exposure time length. Thus, when the optical navigation device 100 supports different exposure time lengths for the different tracking performance requirements, the processing circuit 110 can select a longer exposure time when the working surface is the non-glass surface to avoid that the image brightness is not enough, and it can select a shorter exposure time when the working surface is the glass surface to avoid over-exposure.

Equivalently, the processing circuit 110 is arranged for selecting a corresponding tracking mode among the plurality of different tracking modes as the tracking mode of the optical navigation device 100 in response to a corresponding surface operation condition. Further, the working surface can be a variety of surfaces with different characteristics corresponding to different surface operation conditions of the optical navigation device 100. For example, the working surface may include the material(s) of different glass(es), ceramic tiles with textures, white papers, carpets, planks, white boards, woody textures, different colored papers, plastic, or other different materials; this is not intended to be a limitation of the invention.

Figure 4:
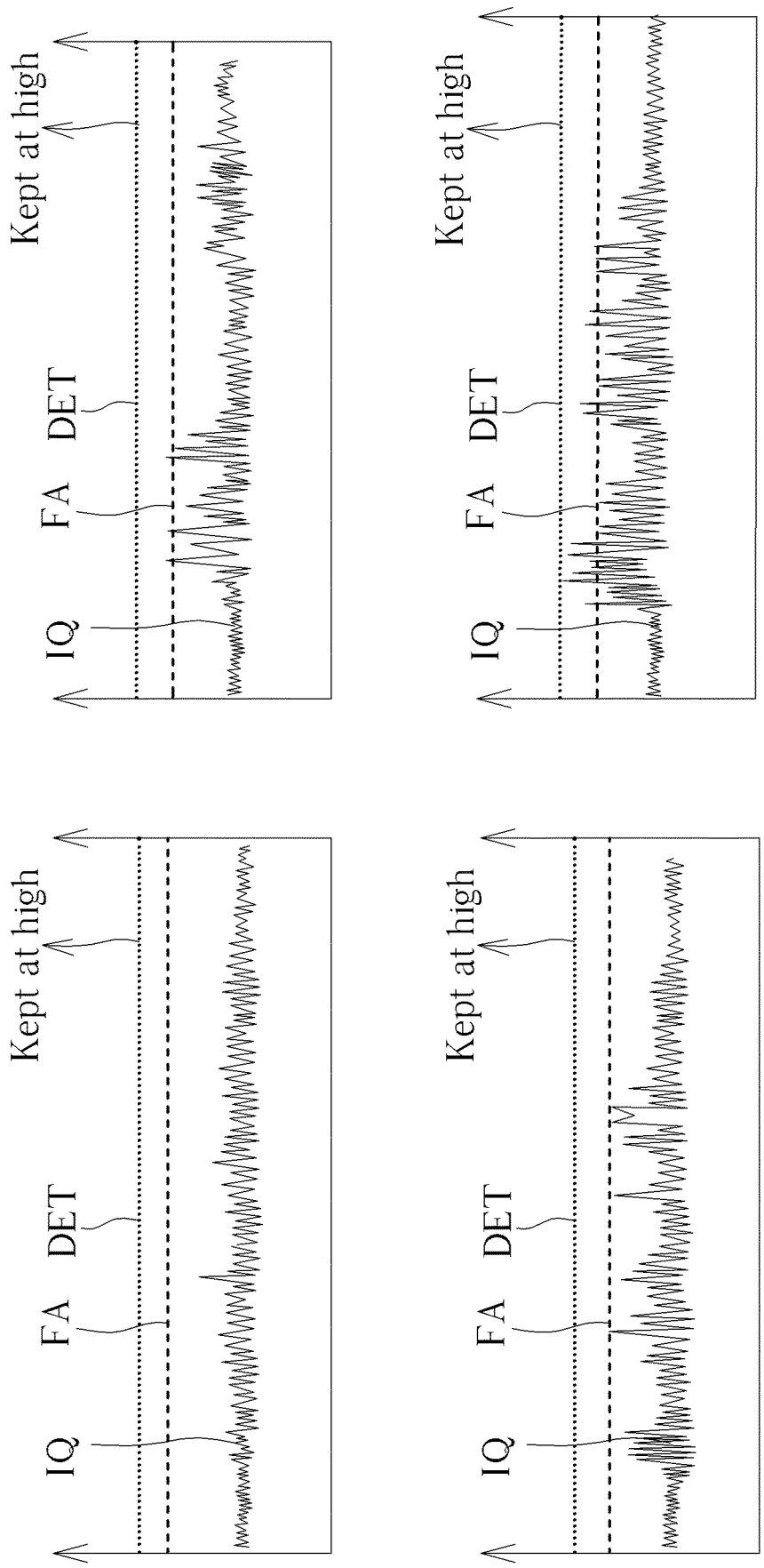
FIG. 4 is a diagram of the surface detections of optical navigation device of FIG. 1 placed onto different glass surfaces according to one embodiment of the invention.

FIG. 4 is a diagram of the surface detections of optical navigation device 100 of FIG. 1 placed onto different glass surfaces according to one embodiment of the invention. In FIG. 4, the solid curves IQ (or the distributions with solid curves) respectively in the four examples indicate the detected image quality results corresponding to the different glass surfaces, the dotted lines/curves FA respectively in the four examples indicate the detected frame image brightness results (i.e. the detected frame image brightness results of the glass surfaces may be similar and almost not changed), and the lines DET respectively in the four examples indicate the results of the surface detections of the optical navigation device 100 wherein the line DET is at a high level to indicate that the optical navigation device 100 can effectively detect that the four working surfaces are glass surfaces.

Figure 5:
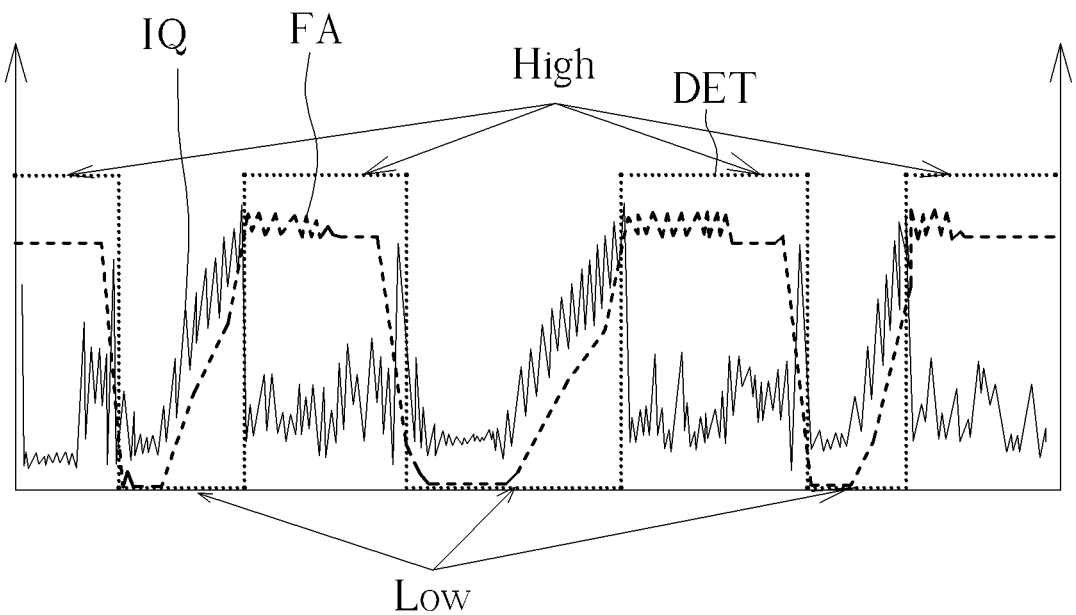
FIG. 5 is a diagram of the surface detection of optical navigation device of FIG. 1 placed onto a working surface formed by ceramic tiles with textures according to a different embodiment of the invention.
Figure 6:
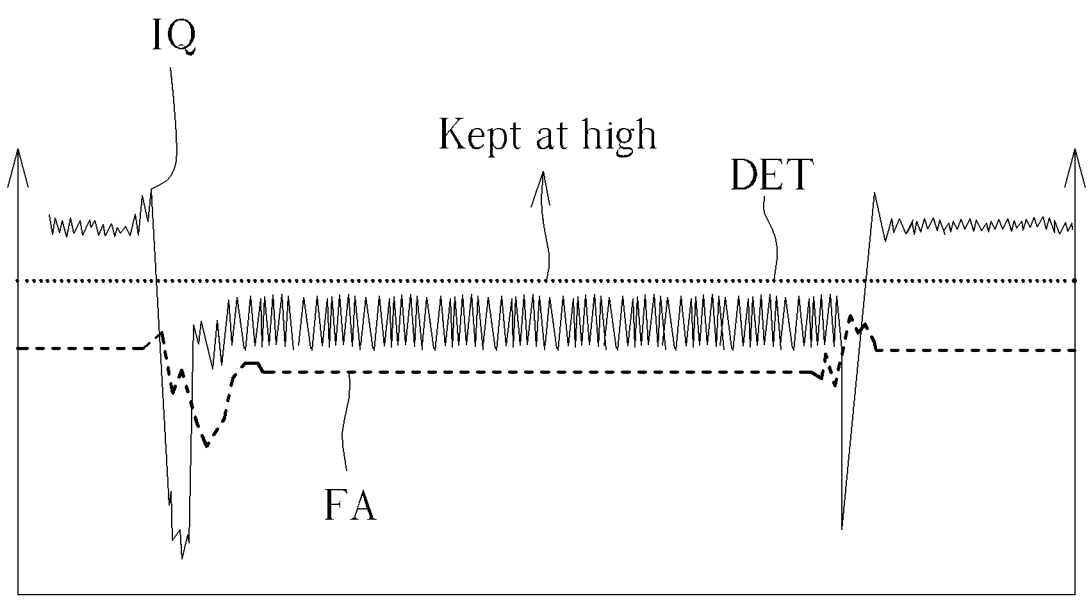
FIG. 6 is a diagram of the surface detection of optical navigation device of FIG. 1 placed onto a paper working surface according to a different embodiment of the invention.
Figure 7:
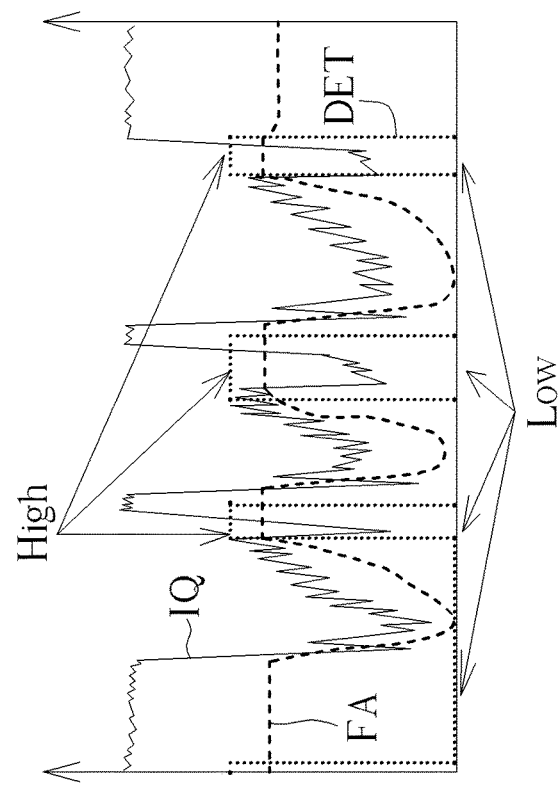
FIG. 7 is a diagram of the surface detection of optical navigation device of FIG. 1 placed onto different working surface such as colored papers and plastic materials according to a different embodiment of the invention.
Figure 7:
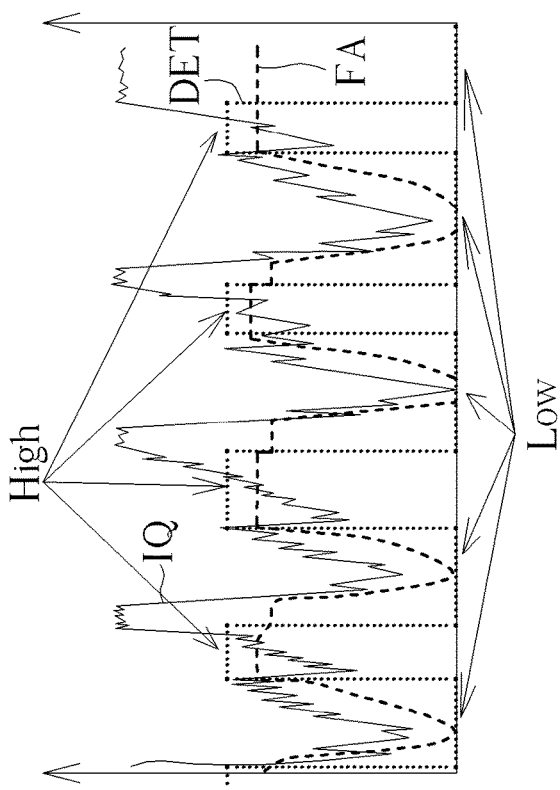
Figure 7:
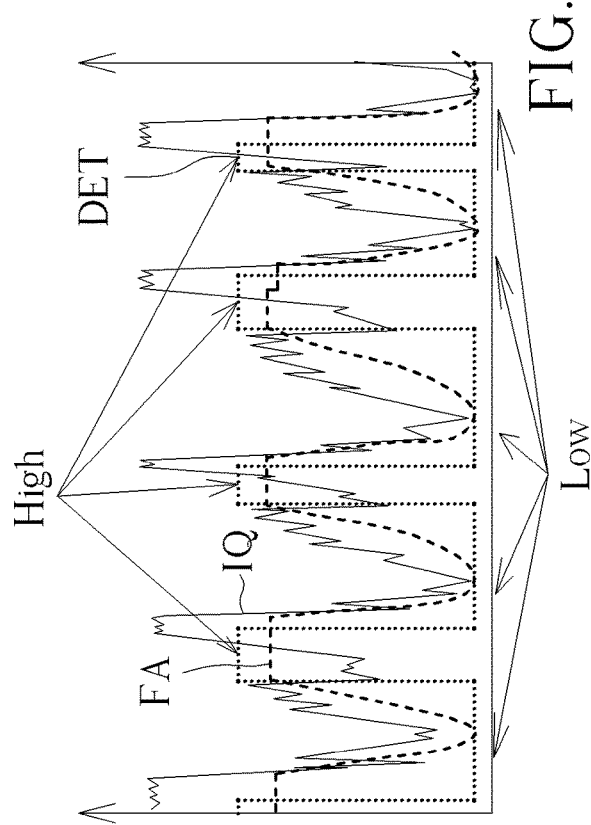
Figure 8:
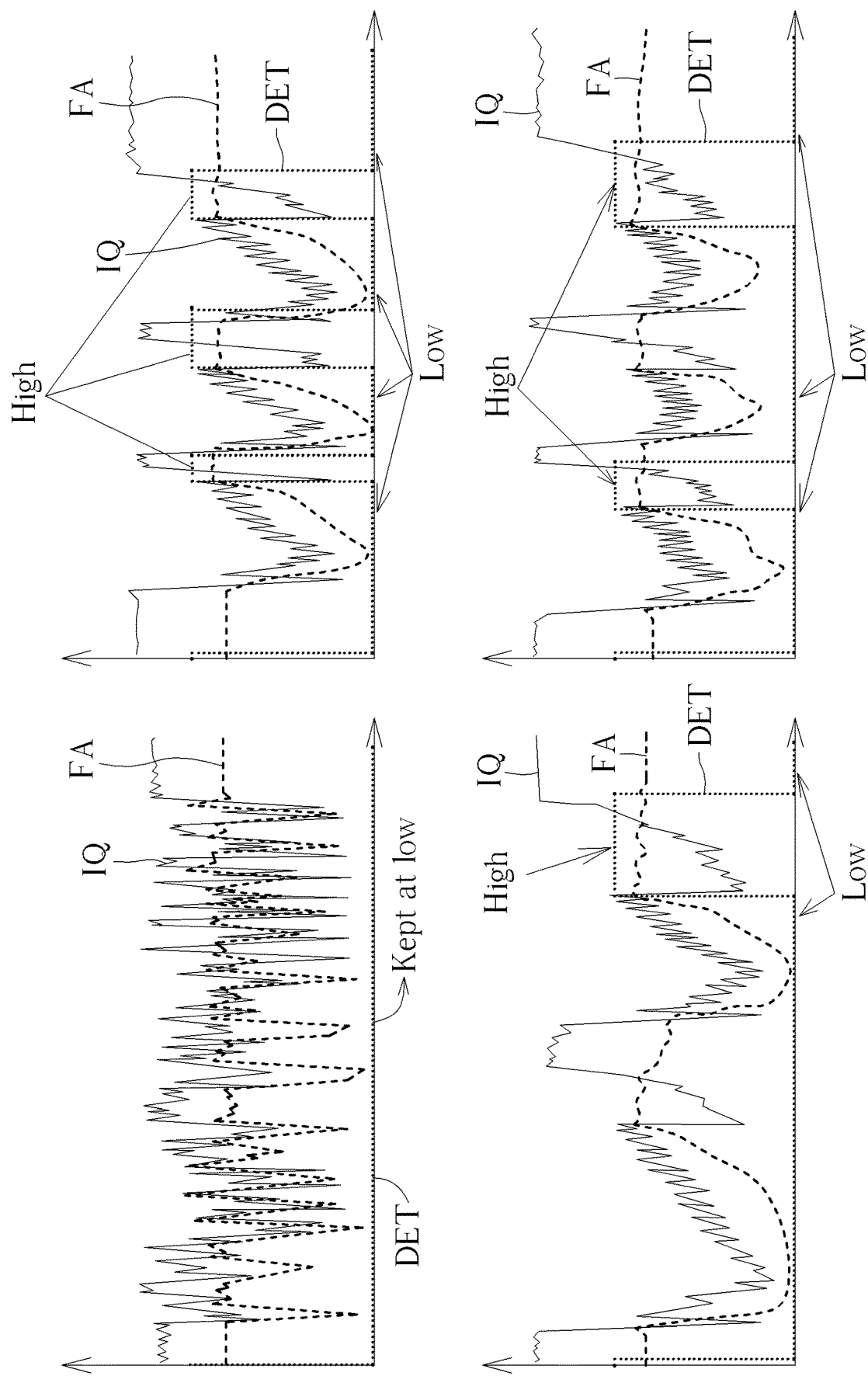
FIG. 8 is a diagram of the surface detection of optical navigation device of FIG. 1 placed onto different working surface such as white board and woody texture surfaces according to a different embodiment of the invention.

FIG. 5 is a diagram of the surface detection of optical navigation device 100 of FIG. 1 placed onto a working surface formed by ceramic tiles with textures according to a different embodiment of the invention. FIG. 6 is a diagram of the surface detection of optical navigation device 100 of FIG. 1 placed onto a paper working surface according to a different embodiment of the invention. FIG. 7 is a diagram of the surface detection of optical navigation device 100 of FIG. 1 placed onto different working surface such as colored papers and plastic materials according to a different embodiment of the invention. FIG. 8 is a diagram of the surface detection of optical navigation device 100 of FIG. 1 placed onto different working surface such as white board and woody texture surfaces according to a different embodiment of the invention. In the examples of FIG. 5, FIG. 6, FIG. 7, and/or FIG. 8, the curve IQ indicates the detected image quality result corresponding to the corresponding working surface, the curve FA indicates the detected frame image brightness result of the corresponding working surface, and the curve DET indicates the result of the surface detection of the optical navigation device 100 wherein a high level of the curve DET indicates that the optical navigation device 100 detects a glass surface while a low level of the curve DET indicates that the optical navigation device 100 detects a non-glass surface.

It should be noted that the tracking performance of a conventional optical navigation device is usually limited due to a glass working surface but not limited by a non-glass surface since the glass working surface may include fewer texture features. In the examples of FIG. 5, FIG. 6, FIG. 7, and/or FIG. 8, even though in some situations the optical navigation device 100 may determine a non-glass surface as a glass surface, however, the surface detection of optical navigation device 100 in the example of FIG. 4 does not erroneously determine a non-glass surface as a glass surface. Thus, the tracking performance of optical navigation device 100 when being placed on the non-glass surfaces in the examples of FIG. 5, FIG. 6, FIG. 7, and/or FIG. 8 will not be affected, and the tracking performance of optical navigation device 100 when being placed on the glass surfaces in the examples of FIG. 4 can be significantly improved since the optical navigation device 100 in this situation can switch into an appropriate/optimal optical tracking setting for the glass surfaces.

Further, in one embodiment, to avoid frequently switching between a glass surface operation condition and a non-glass surface operation condition, the optical navigation device 100 (or processing circuit 110) may employ an adjustable (variable) detection period which may cross different numbers of image frames, e.g. a variable detection period may range from 16 frame times to 2048 frame times. That is, the optical navigation device 100 (or processing circuit 110) may employ a longer detection period to perform the surface detection to determine whether the current working surface is a glass surface or a non-glass surface, so as to increase the reliability of the surface detection to avoid determining a non-glass surface as a glass surface. In other situations, the optical navigation device 100 (or processing circuit 110) may employ a shorter detection period to perform the surface detection, so as to increase the response time of the surface detection of the optical navigation device 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device having a plurality of different tracking modes, comprising:
   an image sensor, arranged for sensing and generating a plurality of image frames; and
   a processing circuit, coupled to the image sensor, arranged for controlling and changing a tracking mode of the optical navigation device from a first tracking mode into a second tracking mode in response to an event that the optical navigation device changes from a first surface operation condition into a second surface operation condition, the processing circuit being used to determine whether the optical navigation device changes from the first surface operation condition into the second surface operation condition by detecting a change of an image quality of an image pattern with image features in the plurality of image frames and by detecting a change of a frame average brightness of the plurality of image frames;

wherein the first surface operation condition and the second surface operation condition are respectively associated with different tracking surfaces on which the optical navigation device placed; at least one of the different tracking surfaces is characterized by a high reflectivity or a low surface roughness; a power consumption of the optical navigation device is different after the tracking mode switches from the first tracking mode into the second tracking mode.

2. The optical navigation device of claim 1, wherein the first surface operation condition is a glass surface operation condition corresponding to a glass surface while the second surface operation condition is a non-glass surface operation condition corresponding to a non-glass surface; the processing circuit determines that the optical navigation device is placed on the glass surface if the detected image quality of the image pattern with the image features is low and the detected frame average brightness is high; the processing circuit determines that the optical navigation device is placed on the non-glass surface if the detected image quality of the image pattern with the image features is high; and, the processing circuit determines that the optical navigation device is lifted if the detected image quality of the image pattern with the image features is low and the detected frame average brightness is low.

3. The optical navigation device of claim 2, wherein, when switching into the second tracking mode corresponding to the non-glass surface operation condition, the processing circuit is arranged to increase a maximum value of a frame rate of the image sensor in the first tracking mode corresponding to the glass surface operation condition, to perform an optical navigation operation based on the increased maximum value of the frame rate.

4. The optical navigation device of claim 2, wherein, when switching into the second tracking mode corresponding to the non-glass surface operation condition, the processing circuit is arranged to decrease a minimum value of a frame rate of the image sensor previously used in the first tracking mode corresponding to the glass surface operation condition, to perform an optical navigation operation based on the decreased minimum value of the frame rate.

5. The optical navigation device of claim 2, wherein, when switching into the second tracking mode corresponding to the non-glass surface operation condition, the processing circuit is arranged for controlling the image sensor increasing a sensor sensitivity of the image sensor previously used in the first tracking mode corresponding to the glass surface operation condition, to perform an optical navigation operation based on the increased sensor sensitivity of the image sensor.

6. The optical navigation device of claim 2, wherein, when switching into the second tracking mode corresponding to the non-glass surface operation condition, the processing circuit is arranged for controlling the image sensor decreasing an image frame size sensed by the image sensor previously used in the first tracking mode corresponding to the glass surface operation condition, to perform an optical navigation operation based on the decreased image frame size.

7. The optical navigation device of claim 2, wherein, when switching into the second tracking mode corresponding to the non-glass surface operation condition, the processing circuit is arranged for controlling and decreasing a power consumption setting of the optical navigation device previously used in the first tracking mode corresponding to the glass surface operation condition, to perform an optical navigation operation based on the decreased power consumption setting.

8. The optical navigation device of claim 2, wherein, when switching into the second tracking mode corresponding to the non-glass surface operation condition, the processing circuit is arranged for controlling and decreasing an exposure time length of the optical navigation device previously used in the first tracking mode corresponding to the glass surface operation condition, to perform an optical navigation operation based on the decreased exposure time length.

9. The optical navigation device of claim 1, wherein the processing circuit is arranged for selecting a corresponding tracking mode among the plurality of different tracking modes as the tracking mode of the optical navigation device in response to a corresponding surface operation condition.

10. A method of an optical navigation device having a plurality of different tracking modes, and the method comprises:

using an image sensor to sense and generate a plurality of image frames; and determining whether the optical navigation device changes from a first surface operation condition into a second surface operation condition by detecting a change of an image quality of an image pattern with image features in the plurality of image frames and by detecting a change of a frame average brightness of the plurality of image frames;

controlling and changing a tracking mode of the optical navigation device from a first tracking mode into a second tracking mode in response to an event that the optical navigation device changes from the first surface operation condition into the second surface operation condition;

wherein the first surface operation condition and the second surface operation condition are respectively associated with different tracking surfaces on which the optical navigation device placed; at least one of the different tracking surfaces is characterized by a high reflectivity or a low surface roughness; a power consumption of the optical navigation device is different after the tracking mode switches from the first tracking mode into the second tracking mode.

11. The method of claim 10, wherein the first surface operation condition is a glass surface operation condition corresponding to a glass surface while the second surface operation condition is a non-glass surface operation condition corresponding to a non-glass surface; it is determined that the optical navigation device is placed on the glass surface if the detected image quality of the image pattern with the image features is low and the detected frame average brightness is high; it is determined that the optical navigation device is placed on the non-glass surface if the detected image quality of the image pattern with the image features is high; and, it is determined that the optical navigation device is lifted if the detected image quality of the image pattern with the image features is low and the detected frame average brightness is low.

12. The method of claim 11, further comprising:

when switching into the second tracking mode corresponding to the non-glass surface operation condition, increasing a maximum value of a frame rate of the image sensor in the first tracking mode corresponding to the glass surface operation condition, to perform an optical navigation operation based on the increased maximum value of the frame rate.

13. The method of claim 11, further comprising:
when switching into the second tracking mode corresponding to the non-glass surface operation condition, decreasing a minimum value of a frame rate of the image sensor previously used in the first tracking mode corresponding to the glass surface operation condition, to perform an optical navigation operation based on the decreased minimum value of the frame rate.

14. The method of claim 11, further comprising:
when switching into the second tracking mode corresponding to the non-glass surface operation condition, controlling the image sensor increasing a sensor sensitivity of the image sensor previously used in the first tracking mode corresponding to the glass surface operation condition, to perform an optical navigation operation based on the increased sensor sensitivity of the image sensor.

15. The method of claim 11, further comprising:
when switching into the second tracking mode corresponding to the non-glass surface operation condition, controlling the image sensor decreasing an image frame size sensed by the image sensor previously used in the first tracking mode corresponding to the glass surface operation condition, to perform an optical navigation operation based on the decreased image frame size.

16. The method of claim 11, further comprising:
when switching into the second tracking mode corresponding to the non-glass surface operation condition, decreasing a power consumption setting of the optical navigation device previously used in the first tracking mode corresponding to the glass surface operation condition, to perform an optical navigation operation based on the decreased power consumption setting.

17. The method of claim 11, further comprising:
when switching into the second tracking mode corresponding to the non-glass surface operation condition, decreasing an exposure time length of the optical navigation device previously used in the first tracking mode corresponding to the glass surface operation condition, to perform an optical navigation operation based on the decreased exposure time length.

18. The method of claim 10, further comprising:
selecting a corresponding tracking mode among the plurality of different tracking modes as the tracking mode of the optical navigation device in response to a corresponding surface operation condition.

* * * * *